(12) United States Patent
Park

(10) Patent No.: US 11,148,713 B2
(45) Date of Patent: Oct. 19, 2021

(54) VEHICLE STEERING APPARATUS

(71) Applicant: MANDO CORPORATION, Gyeonggi-do (KR)

(72) Inventor: Sung Hun Park, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 140 days.

(21) Appl. No.: 16/593,951

(22) Filed: Oct. 4, 2019

(65) Prior Publication Data
US 2020/0108865 A1    Apr. 9, 2020

(30) Foreign Application Priority Data

Oct. 8, 2018    (KR) .......................... 10-2018-0120074

(51) Int. Cl.
| | | |
|---|---|---|
| *B62D 7/22* | (2006.01) | |
| *F16D 3/06* | (2006.01) | |
| *B62D 1/16* | (2006.01) | |
| *F16F 15/10* | (2006.01) | |

(52) U.S. Cl.
CPC .............. *B62D 7/224* (2013.01); *B62D 1/16* (2013.01); *F16D 3/06* (2013.01); *F16F 15/10* (2013.01)

(58) Field of Classification Search
CPC . B62D 1/20; B62D 7/22; B62D 7/226; B62D 1/16; F16D 3/06; F16D 3/12
See application file for complete search history.

(56) References Cited

U.S. PATENT DOCUMENTS

| | | | | |
|---|---|---|---|---|
| 5,243,874 A | * | 9/1993 | Wolfe | ............... B29C 45/14754 280/775 |
| 5,902,186 A | * | 5/1999 | Gaukel | ................. F16F 15/126 464/162 |
| 6,241,616 B1 | * | 6/2001 | Lightcap | ................... F16C 3/03 464/162 |
| 7,288,029 B1 | * | 10/2007 | Lyon | ........................ F16C 3/03 403/359.6 |

(Continued)

FOREIGN PATENT DOCUMENTS

| | | |
|---|---|---|
| CN | 101332828 | 12/2008 |
| CN | 107813864 | 3/2018 |

OTHER PUBLICATIONS

Office Action dated Sep. 3, 2021 for Chinese Patent Application No. 201910948974.5 and its English translation from Global Dossier.

*Primary Examiner* — James A English
(74) *Attorney, Agent, or Firm* — Ladas & Parry, LLP

(57) ABSTRACT

A vehicle steering apparatus is provided that includes a first shaft having an empty space inside, a second shaft, one end of which is inserted into inside of the first hollow shaft, a damper located between an inner circumferential surface of the first shaft and an outer circumferential surface of the second shaft, and a presser coupled to the one end of the second shaft and pressing the damper in an axial direction in which at least one of the first shaft or the second shaft extends. By using the vehicle steering apparatus, it is possible to provide various degrees of the rigidity according to requirements of vehicles by adjusting the rigidity of a damper capable of improving driver's steering feeling through the absorbing of vibration in a coupling mechanism for coupling shafts after having been assembled.

17 Claims, 13 Drawing Sheets

(56) References Cited

U.S. PATENT DOCUMENTS

| | | | | |
|---|---|---|---|---|
| 2002/0190450 A1* | 12/2002 | Honda | ................... | B62D 7/224 |
| | | | | 267/141 |
| 2015/0045126 A1* | 2/2015 | Hansen | ................... | F16D 3/387 |
| | | | | 464/112 |
| 2015/0246689 A1* | 9/2015 | Kornmayer | ........... | F16F 15/126 |
| | | | | 74/493 |
| 2015/0275946 A1* | 10/2015 | Ishizaki | ................... | F16D 3/68 |
| | | | | 403/359.1 |

* cited by examiner

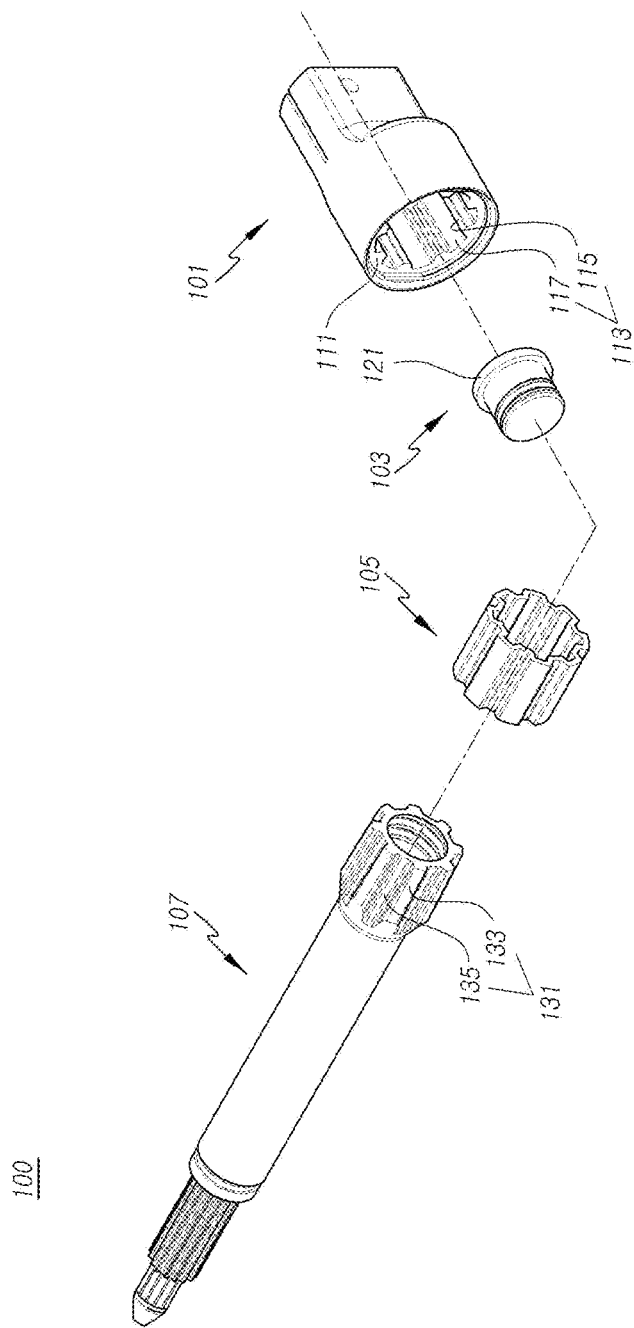
[FIG. 1]

[FIG. 2]
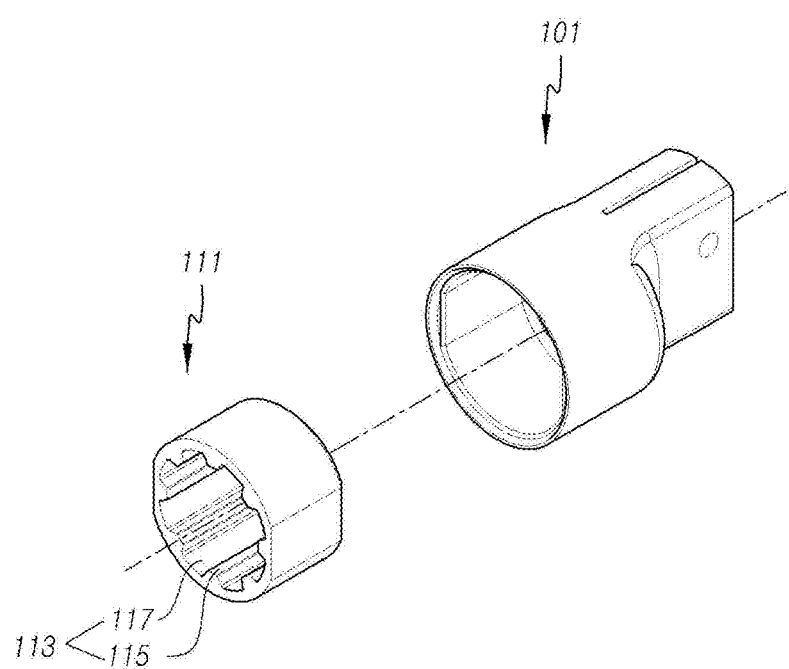

[FIG. 3]
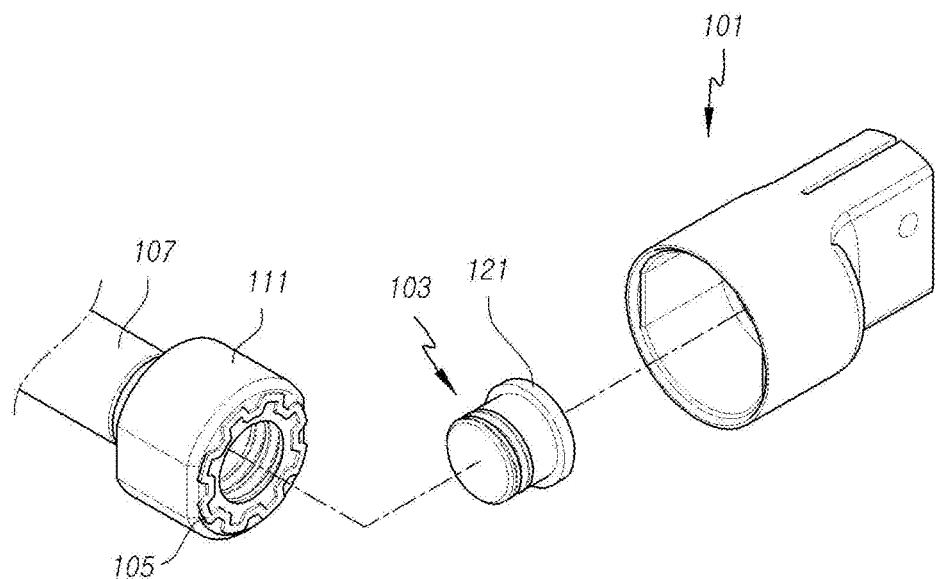

[FIG. 4]
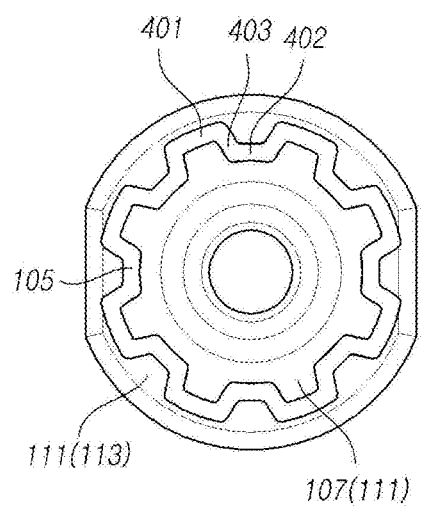
[FIG. 5]
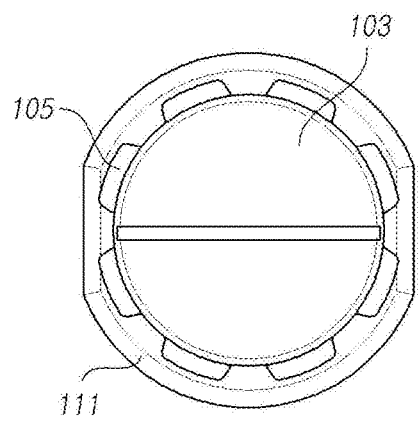

[FIG. 6]
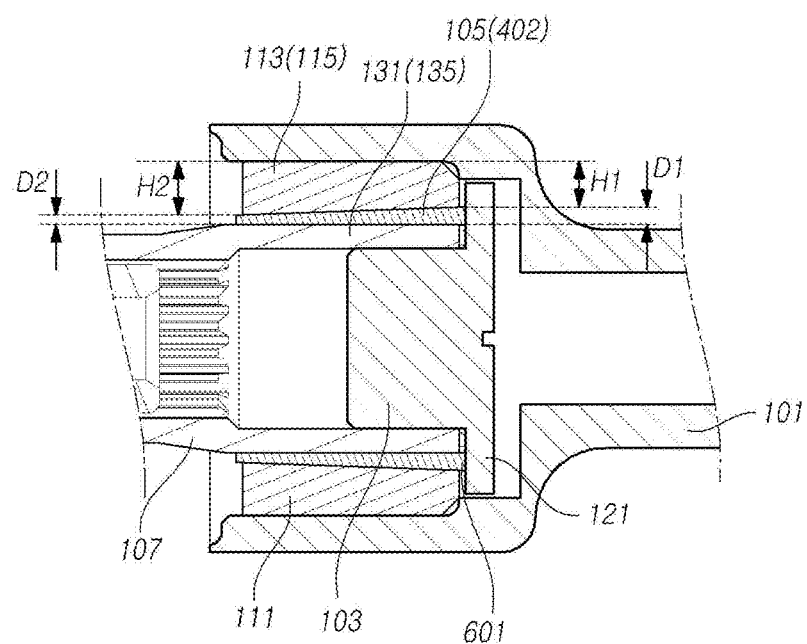

【FIG. 7】
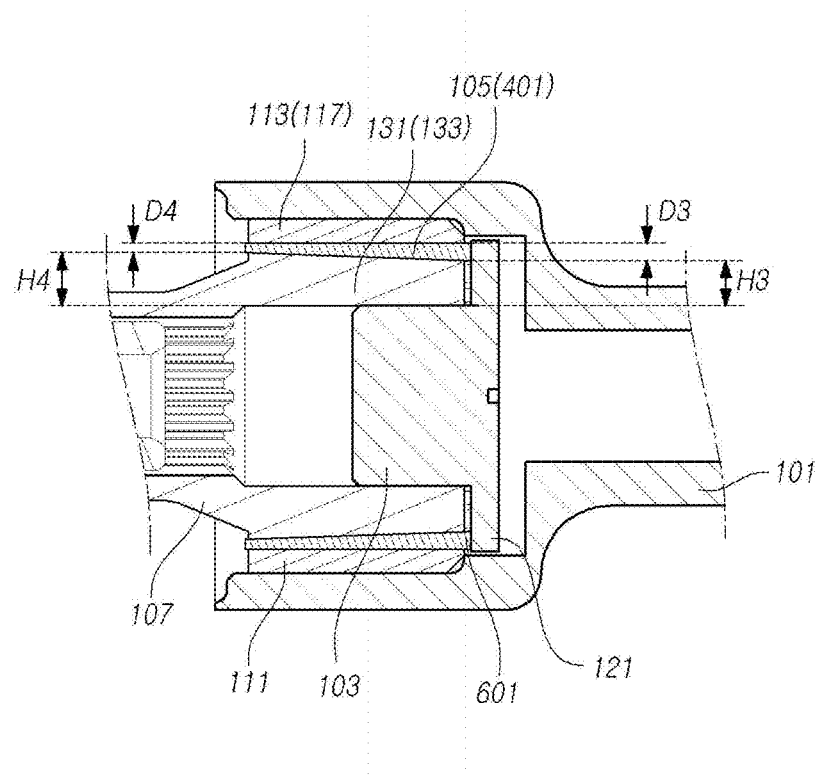
【FIG. 8】
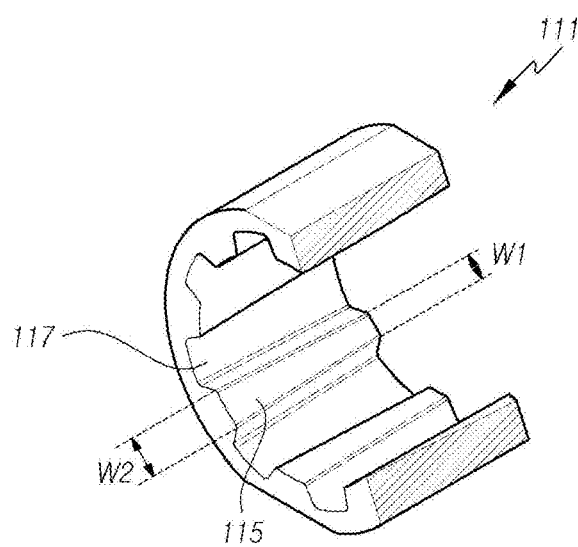

[FIG. 9]
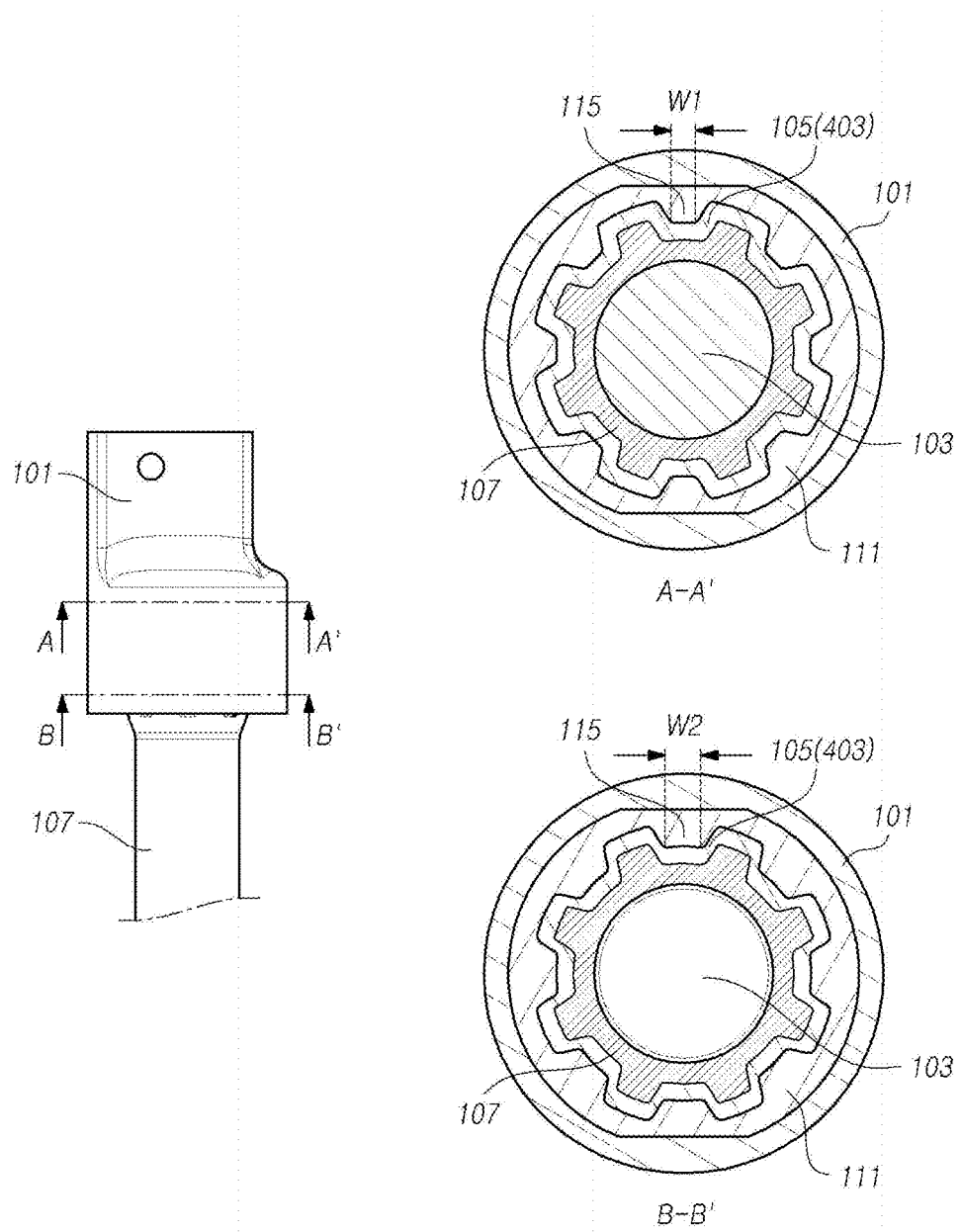

[FIG. 10]
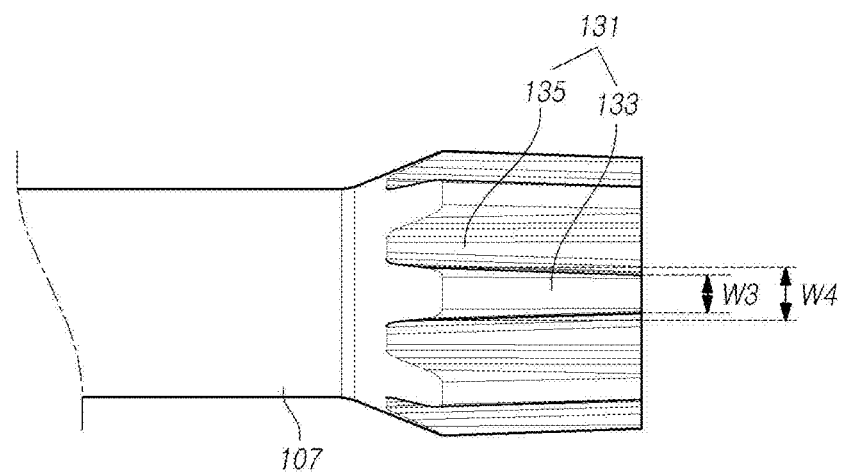

[FIG. 11]
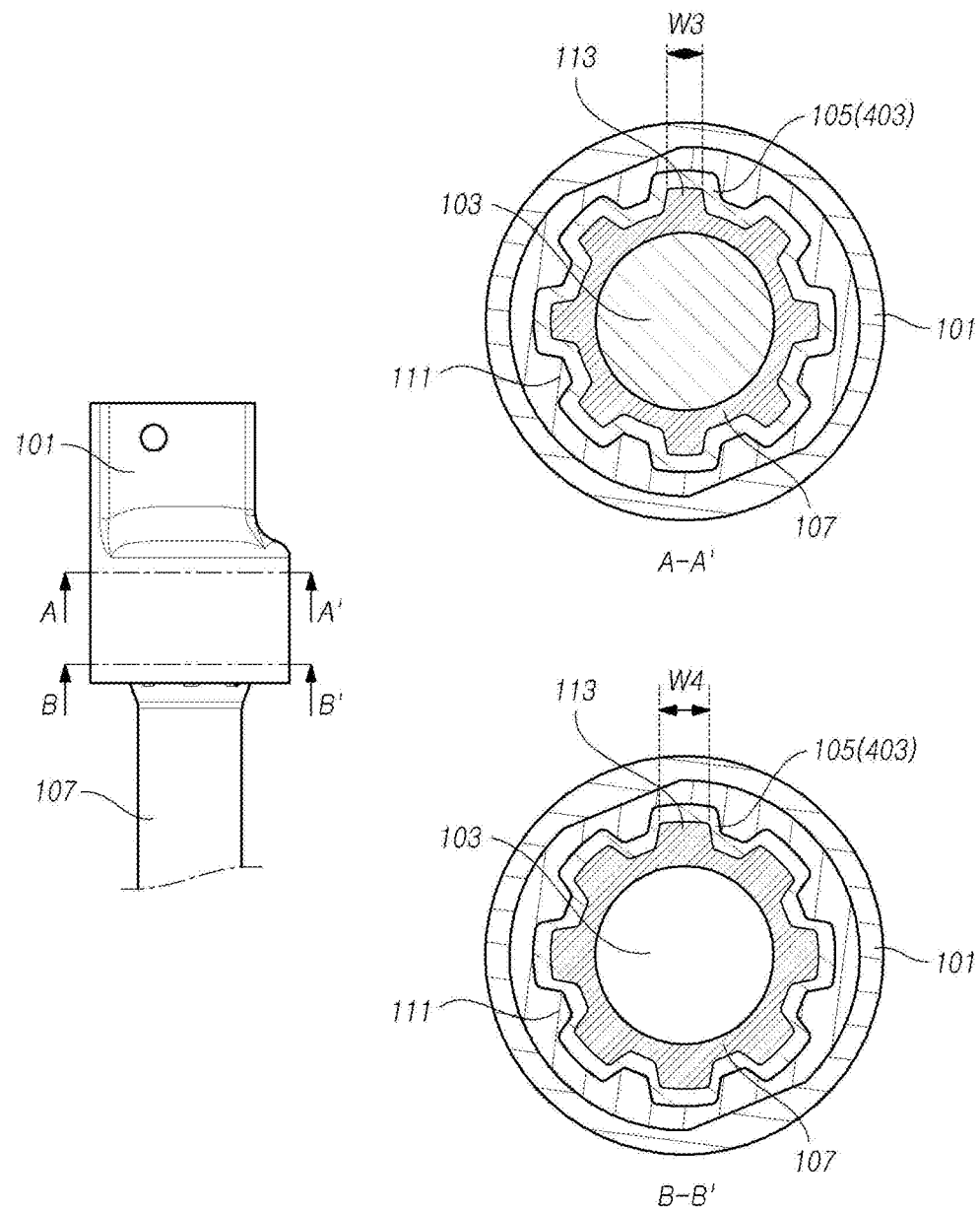

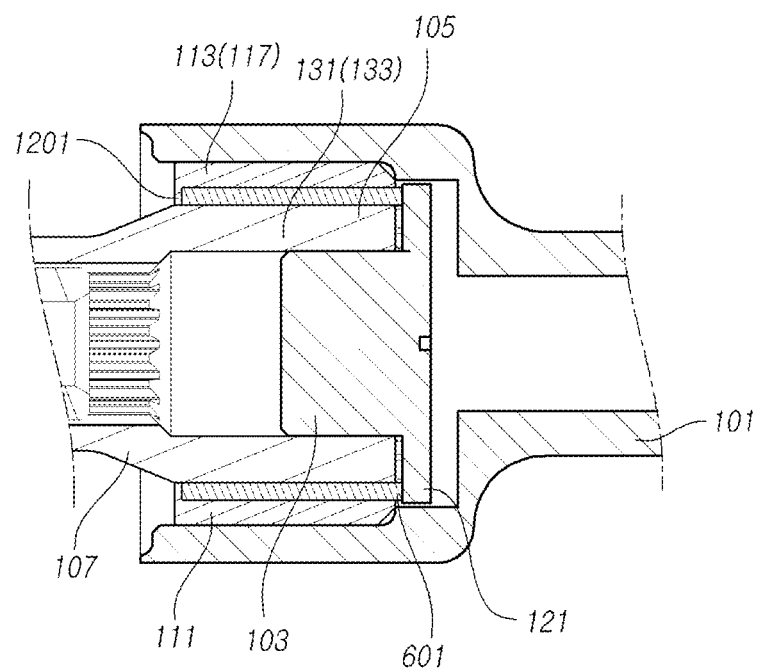
[FIG. 12]

[FIG. 13]
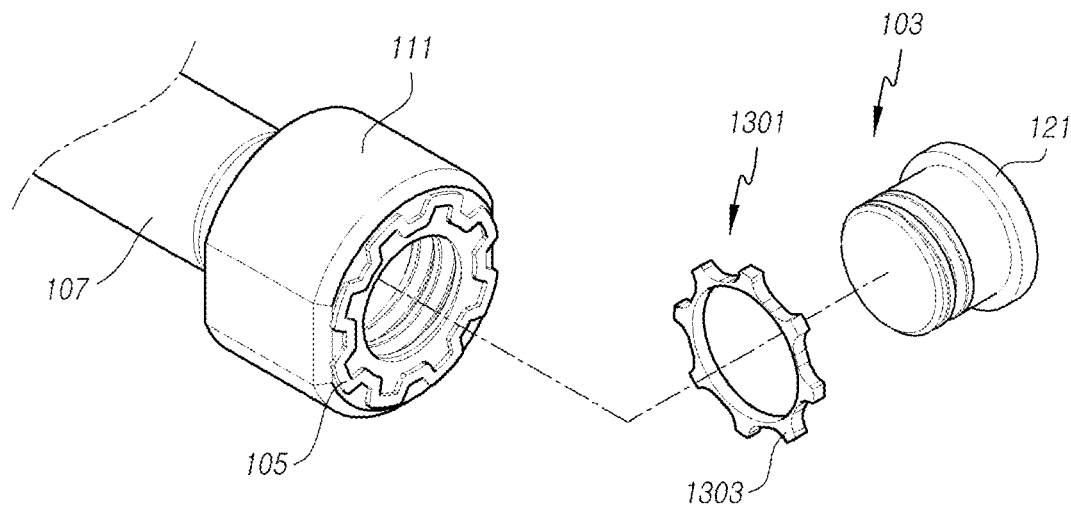
[FIG. 14]
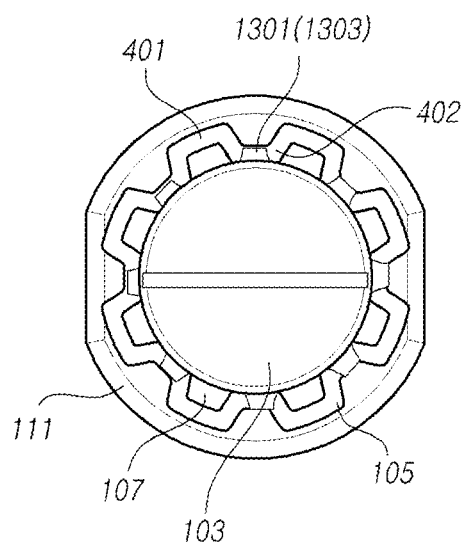

[FIG. 15]
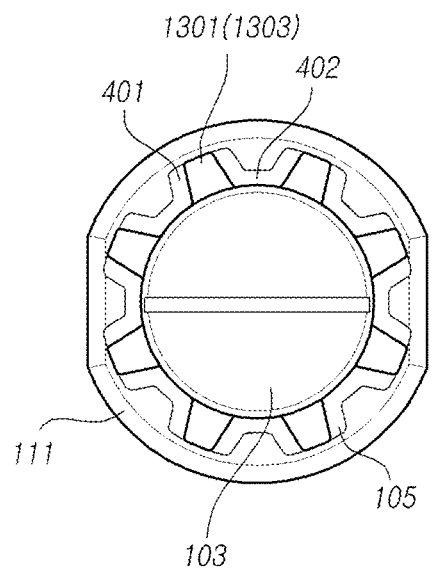
[FIG. 16]
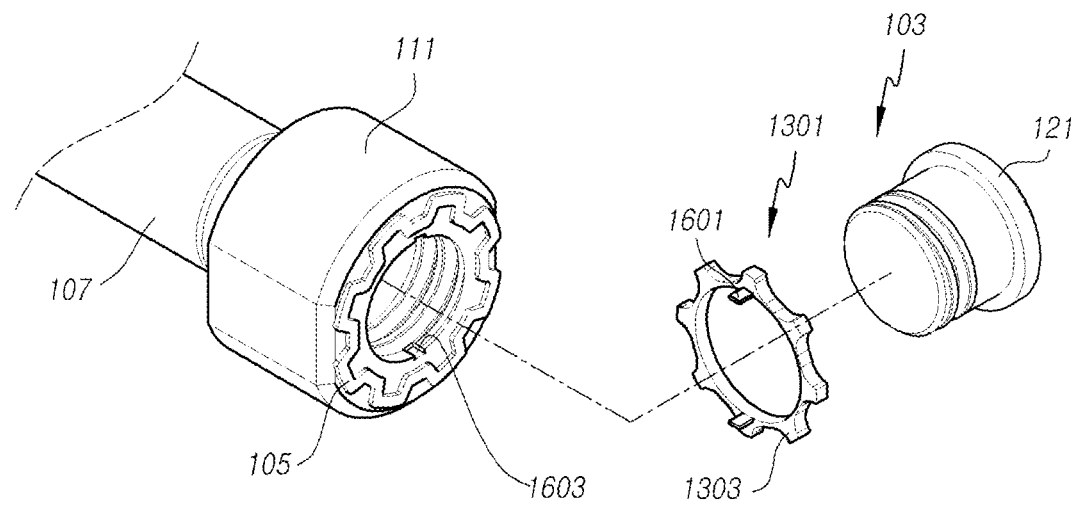

【FIG. 17】
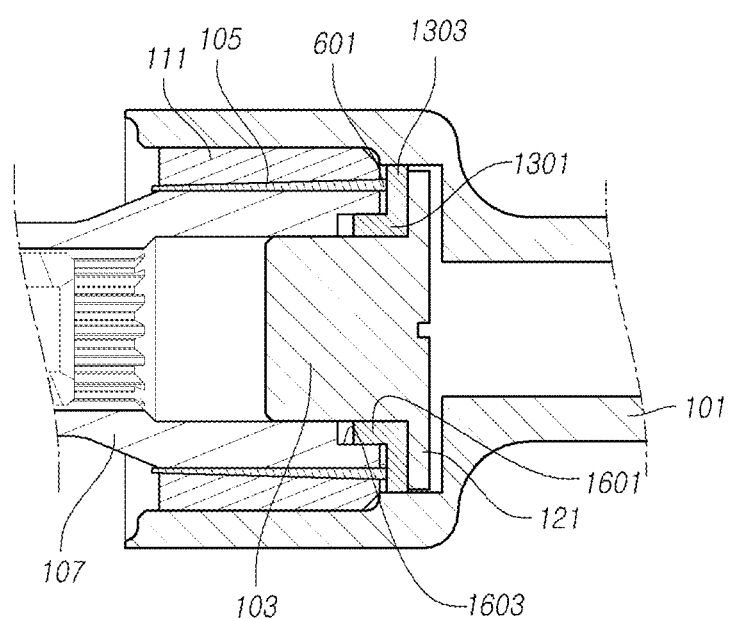

VEHICLE STEERING APPARATUS

CROSS-REFERENCE TO RELATED APPLICATION

This application claims the priority benefit of Korean Patent Application No. 10-2018-0120074, filed on Oct. 8, 2018 in the Korean Intellectual Property Office, the disclosure of which is incorporated herein by reference in its entirety.

BACKGROUND

1. Field of the Disclosure

The present disclosure relates to vehicle steering apparatuses. More specifically, the present disclosure relates to vehicle steering apparatuses for providing various degrees of rigidity according to requirements of vehicles by adjusting the rigidity of a damper capable of improving driver's steering feeling through the absorbing of vibration in a coupling mechanism for coupling shafts after having been assembled.

2. Description of the Background

A steering system of a vehicle is an apparatus for allowing a driver to change a direction in which the vehicle travels by turning a steering wheel. The steering system is an assist apparatus for enabling the front wheels of the vehicle to be changed at a desired angle relative to a traveling road or lane, and thereby, helping the driver to steer the vehicle in a direction in which the driver desires to travel.

As a steering shaft connected to the steering wheel is rotated by a driver and engaged with a rack bar connected to the wheels of the vehicle by tie rods, the vehicle can change a traveling direction to a desired direction.

The steering shaft includes a universal joint for enabling rotational force to be transmitted to two shafts in a case where the steering shaft is not formed of a coaxial shaft. To absorb vibration caused by the impact of the vehicle landing on a road or the like during vehicle driving, a damper is provided between a shaft and a yoke in the universal joint.

The damper requires different rigidity depending on characteristics of a vehicle. In typical steering apparatuses, since the rigidity of the damper is depending on an injection speed for injection molding, the hardness of a material, and the like, and cannot be adjusted after the injection molding, there is inconvenience of differently setting the rigidity of the damper for each vehicle type when the injection molding for the damper is performed.

SUMMARY

Accordingly, the present disclosure is directed to vehicle steering apparatuses that substantially obviate one or more problems due to limitations and disadvantages of the prior art.

It is at least one object of the present disclosure to provide a vehicle steering apparatus for providing various degrees of rigidity according to requirements of vehicles by adjusting the rigidity of a damper capable of improving driver's steering feeling through the absorbing of vibration in a coupling mechanism for coupling shafts after having been assembled.

Objects of the present disclosure are not limited thereto, and other objects other than the at least one object may be clearly understood by those skilled in the art from description below.

In accordance with embodiments of the present disclosure, a vehicle steering apparatus is provided that includes a first shaft having an empty space inside, a second shaft, one end of which is inserted into inside of the first hollow shaft, a damper located between an inner circumferential surface of the first shaft and an outer circumferential surface of the second shaft, and a presser coupled to the one end of the second shaft and pressing the damper in a direction in which at least one of the first shaft or the second shaft extends (hereinafter, referred to as "axial direction").

In accordance with embodiments of the present disclosure, it is possible to provide various degrees of rigidity according to requirements of vehicles by adjusting the rigidity of a damper capable of improving driver's steering feeling through the absorbing of vibration or impacts in a coupling mechanism for coupling shafts after having been assembled.

Additional features and advantages of the disclosure will be set forth in the description which follows and in part will be apparent from the description, or may be learned by practice of the disclosure. The objectives and other advantages of the disclosure will be realized and attained by the structure particularly pointed out in the written description and claims hereof as well as the appended drawings.

BRIEF DESCRIPTION OF THE DRAWINGS

FIG. 1 is an exploded perspective view of a vehicle steering apparatus according to embodiments of the present disclosure.

FIGS. 2 and 3 are perspective views illustrating a part of the vehicle steering apparatus in FIG. 1.

FIGS. 4 and 5 are front views illustrating a part of a combined structure in the vehicle steering apparatus of FIG. 1.

FIGS. 6 and 7 are cross-sectional views of the vehicle steering apparatus according to embodiments of the present disclosure.

FIG. 8 is a perspective view illustrating a part of the vehicle steering apparatus according to embodiments of the present disclosure.

FIG. 9 is a side view and a cross-sectional view illustrating a part of the vehicle steering apparatus according to embodiments of the present disclosure.

FIG. 10 is a side view illustrating a part of the vehicle steering apparatus according to embodiments of the present disclosure.

FIG. 11 is a side view and a cross-sectional view illustrating apart of the vehicle steering apparatus according to embodiments of the present disclosure.

FIG. 12 is a cross-sectional view illustrating a part of the vehicle steering apparatus according to embodiments of the present disclosure.

FIG. 13 is a perspective view of the vehicle steering apparatus according to embodiments of the present disclosure.

FIGS. 14 and 15 are front views of the vehicle steering apparatus according to embodiments of the present disclosure.

FIG. 16 is a perspective view of the vehicle steering apparatus according to embodiments of the present disclosure.

FIG. 17 is a cross-sectional view illustrating a combined structure in FIG. 16.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to al low other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is an exploded perspective view of a vehicle steering apparatus according to embodiments of the present disclosure; FIGS. 2 and 3 are perspective views illustrating apart of the vehicle steering apparatus in FIG. 1; FIGS. 4 and 5 are front views illustrating a part of a combined structure in the vehicle steering apparatus of FIG. 1; FIGS. 6 and 7 are cross-sectional views of the vehicle steering apparatus according to embodiments of the present disclosure; FIG. 8 is a perspective view illustrating a part of the vehicle steering apparatus according to embodiments of the present disclosure; FIG. 9 is a side view and a cross-sectional view illustrating a part of the vehicle steering apparatus according to embodiments of the present disclosure; FIG. 10 is a side view illustrating a part of the vehicle steering apparatus according to embodiments of the present disclosure; FIG. 11 is a side view and a cross-sectional view illustrating a part of the vehicle steering apparatus according to embodiments of the present disclosure; FIG. 12 is a cross-sectional view illustrating a part of the vehicle steering apparatus according to embodiments of the present disclosure; FIG. 13 is a perspective view of the vehicle steering apparatus according to embodiments of the present disclosure; FIGS. 14 and 15 are front views of the vehicle steering apparatus according to embodiments of the present disclosure; FIG. 16 is a perspective view of the vehicle steering apparatus according to embodiments of the present disclosure; and FIG. 17 is a cross-sectional view illustrating a combined structure in FIG. 16.

In accordance with embodiments of the present disclosure, a vehicle steering apparatus 100 is provided that includes a first shaft 101 having an empty space inside, a second shaft 107, one end of which is inserted into inside of the first hollow shaft 101, a damper 105 located between at least a part of an inner circumferential surface of the first shaft 101 and at least apart of an outer circumferential surface of the second shaft 107, and a presser 103 coupled to the one end of the second shaft 107 and pressing the damper 105 in the axial direction.

Each or all of the first shaft 101 and the second shaft 107 can constitute a part of a steering shaft; however, embodiments of the present disclosure are not limited thereto. For example, the first shaft 101 may be a yoke of a universal joint, and the second shaft 107 may be a shaft of the universal joint which is coupled with the yoke and the damper, although this configuration is not shown.

Referring to FIGS. 1, 2 and 3, the first shaft 101 has an empty space inside, and one end of the second shaft 107 is inserted into inside of the first shaft 101.

The damper 105 is located between at least a part of the inner circumferential surface of the first shaft 101 and at least a part of the outer circumferential surface of the second shaft 107. When the first shaft 101 and the second shaft 107 are rotated, the damper 105 helps driver's steering feeling to improve by absorbing vibration generated in a portion in which the shafts are coupled.

The presser 103 is coupled to the one end of the second shaft 107 and presses the damper 105 in the axial direction.

As described below, a gap between an inner circumferential surface of a coupler 111 and an outer circumferential surface of the second shaft 107 can be smaller from one side to the other side of the second shaft 107, or a stopper 1201 protruding from the inner circumferential surface of the coupler 111 can be formed and then, supported on a portion of the damper 105, such as one side, the other side, one end, or the other end thereof, in the axial direction. As a result, the rigidity of the damper 105 can be increased as the presser 103 presses the damper 105, and then, the damper 105 is pressed. Accordingly, the rigidity of the damper 105 can be adjusted after being assembled, and different degrees of rigidity can be realized according to requirements of a vehicle.

The coupler 111 having an empty space inside can be inserted to the inner circumferential surface of the first shaft 101, and the damper 105 can be located between the inner circumferential surface of the coupler 111 and the outer circumferential surface of the second shaft 107.

As shown in drawings, since the outer circumferential surface of the coupler 111 and the inner circumferential surface of the first shaft 101 have respective flat portions through which the coupler 111 and the first shaft 101 are supported by each other, the coupler 111 can be fixed to the first shaft 101 in a circumferential direction. For example, the coupler 111 can be pressed against and coupled to the first shaft 101.

Further, for example, in a case where the damper 105 is molded by injection molding, the molding of the damper 105 and an assembly between shafts can be simplified by using the coupler 111.

That is, the damper 105 and the coupler 111 can be molded into the second shaft 107 by double injection molding, or the damper 105 and the coupler 111 can be molded separately by the injection molding and then coupled to the second shaft 107. Thereafter, by coupling the second shaft 107 in which the damper 105 and the coupler 111 are coupled to the first shaft 101, it is possible to mold the damper 105 and assemble the shafts in a more simplified manner than the damper 105 is molded by the injection molding between the inner circumferential surface of the first shaft 101 and the outer circumferential surface of the second shaft 107.

Further, although not shown in drawings, the second shaft 107 may be separated into a spline portion on which a second spline 131 is formed and a shaft portion coupled to the spline portion. In this case, the spline portion and the shaft portion may be manufactured separately. Thereafter, the damper 105 and the coupler 111 may be molded to the spline portion by double injection molding, and then the spline portion and the shaft portion may be assembled.

Meanwhile, for enabling the first shaft 101 and the second shaft 107 to be supported by each other in a circumferential direction and to be rotated integrally, the coupler 111 includes a first spline 113 formed on the inner circumferential surface thereof, and the second shaft 107 includes a second spline 131 formed on the outer circumferential surface thereof and engaged with the first spline 113.

That is, since the coupler 111 and the second shaft 107 are fixed in the circumferential direction by the first spline 113 and the second spline 131, and the coupler 111 and the first shaft 101 are fixed in the circumferential direction by the respective flat portions supporting each other, thus, the first shaft 101 and the second shaft 107 are rotated integrally, and the damper 105 can absorb vibration generated between the first spline 113 and the second spline 131.

As described above, the rigidity of the damper 105 is increased as the presser 103 presses and compresses the damper 105 in the axial direction. In this case, the second shaft 107 has an empty space inside, and the presser 103 can be inserted and screwed to the inner circumferential surface of the second shaft 107.

Further, the presser 103 includes a supporter 121 which protrudes from the outer circumferential surface of the presser 103 in a radial direction and which is supported by the damper 105 in the axial direction. When the presser 103 is coupled to the second shaft 107 and moves forward, the supporter 121 can press the damper 105.

Referring to FIGS. 4 and 5, the damper 105 is located between the first spline 113 and the second spline 131. To this end, the damper 105 includes an outer side portion 401 that protrudes in an outward radial direction between a root 117 of the first spline 113 and a crest 133 of the second spline 131, which can include one or more protrusions, an inner side portion 402 that is grooved in an inward radial direction between a crest 115 of the first spline 113 and a root 135 of the second spline 131, which can includes one or more grooves, and a connection portion 403 that is located between the crest 115 of the first spline 113 and the crest 133 of the second spline 131, which can be located in the circumferential direction.

Further, as shown in drawings, since the supporter 121 covers respective parts of the inner side portion 402 and the connection portion 403, and the presser 103 is coupled to the second shaft 107, it is possible for the presser 103 to press the damper 105.

That is, the presser 103 is coupled to one end of the second shaft 107 and proceeds to the other end thereof. As the presser 103 presses the damper 105 from one side to the other end of the second shaft 107, the damper 105 is compressed between the coupler 111 and the second shaft 107; therefore, the rigidity of the damper 105 can be increased.

Alternatively, as the presser 103 is moved backward from one end of the second shaft 107, the damper 105 is decompressed between the coupler 111 and the second shaft 107; thus, the rigidity of the damper 105 can be decreased.

Since the first shaft 101 has an empty space inside, even after the first shaft 101 and the second shaft 107 are coupled to each other, a head portion of the presser 103 is not covered through the first shaft 101; thus, the presser 103 may be moved forward or backward.

That is, without differently setting the rigidity of the damper 105 when it is molded by the injection molding in order to satisfy the rigidity thereof required according to characteristics of types of vehicles, it is possible to satisfy a required degree of the rigidity of the damper 105 by increasing or decreasing the rigidity through the adjusting of a degree of coupling of the presser 103, after the first shaft 101 and the second shaft 107 have been assembled.

Further, in order to enable the damper 105 to be easily pressed by the supporter 121, the damper 105 can include a protrusion portion 601 that protrudes in the axial direction between the first shaft 101 and the second shaft 107 and that is supported by the supporter 121, as shown in FIG. 6.

Meanwhile, as described above, to enable the damper 105 to be compressed between the coupler 111 and the second shaft 107 as the presser 103 moves forward, a gap between the inner circumferential surface of the coupler 111 and the outer circumferential surface of the second shaft 107 becomes smaller from one side to the other side of the coupler 111, or a stopper 1201 protruding from the inner circumferential surface of the coupler 111 is formed and then, supported on a portion of the damper 105, such as one side, one end, the other side, or the other end thereof, in the axial direction.

In a case where a height of the crest 115 of the first spline 113 which protrudes in the inward radial direction can become larger from one side to the other side of the first spline 113 in the axial direction, or a height of the crest 133 of the second spline 131 which protrudes in the outward radial direction can become larger from one side to the other side of the second spline 131 in the axial direction, a gap between the inner circumferential surface of the first shaft 101 and the outer circumferential surface of the second shaft 107 can become smaller from one side to the other side of any of the first shaft 101 or the second shaft 107.

Referring to FIG. 6, as a height of the crest 115 of the first spline 113 becomes larger from one side to the other side of the first spline 113, i.e. H2>H1, a thickness of the inner side portion 402 of the damper 105, which corresponds between the crest 115 of the first spline 113 and the root 135 of the second spline 131, becomes smaller from one side to the other side of any of the first spline 113 or the second spline 131, i.e. D2<D1.

As described above, the damper 105 includes the protrusion portion 601 protruding in the axial direction. Since the protrusion portion 601 protrudes in the axial direction between the coupler 111 and the second shaft 107, the protrusion portion 601 can be supported by the supporter 121 of the presser 103.

Referring to FIG. 7, as a height of the crest 133 of the second spline 131 become larger from one side to the other side of the second spline 131, i.e. H4>H3, a thickness of the outer side portion 401 of the damper 105, which corresponds between the root 117 of the first spline 113 and the crest 133 of the second spline 131, becomes smaller from one side to the other side of any of the first spline 113 or the second spline 131, i.e. D4<D3.

Alternatively, in a case where a circumferential width of the crest 115 of the first spline 113 can become larger from one side to the other side of the first spline 113 in the axial direction, or a circumferential width of the crest 133 of the second spline 131 can become larger from one side to the other side of the second spline 131 in the axial direction, a gap between the inner circumferential surface of the first shaft 101 and the outer circumferential surface of the second shaft 107 can become smaller from one side to the other side of any of the first shaft 101 or the second shaft 107.

Referring to FIGS. 8 and 9, as a circumferential width of the crest 115 of the first spline 113 becomes larger from one side to the other side of the first spline 113, i.e. W2>W1, a thickness of the connection portion 403 of the damper 105, which corresponds between the crest 115 of the first spline 113 and the crest 133 of the second spline 131, becomes smaller from one side to the other side of any of the first spline 113 or the second spline 131.

Referring to FIGS. 10 and 11, as a circumferential width of the crest 115 of the second spline 131 becomes larger from one side to the other side of the second spline 131, i.e. W4>W3, a thickness of the connection portion 403 of the damper 105, which corresponds between the crest 115 of the first spline 113 and the crest 133 of the second spline 131, becomes smaller from one side to the other side of any of the first spline 113 or the second spline 131.

Through this mechanism, a gap between the coupler 111 and the second shaft 107 becomes smaller from one side to the other side of any of the first shaft 101 or the second shaft 107 by the shape of the first spline 113 or the second spline 131, and therefore, a thickness of the damper 10 becomes smaller from one side to the other side of any of the first shaft 101 or the second shaft 107. Thus, as the presser 103 moves forward at the second shaft 107, the damper 105 is compressed and the rigidity of the damper 105 is increased, or as the presser 103 moves backward at the second shaft 107, the damper 105 is decompressed and the rigidity of the damper 105 is decreased. As a result, the rigidity of the damper can be adjusted even after having been assembled.

In the drawings, although two case, that is, one case where a height of the first spline 113 in the inward radial direction becomes larger, and the other case where a circumferential width of the first spline 113 in the circumferential direction becomes larger, from one side to the other side of the first spline 113, are illustrated; however, embodiments of the present disclosure are not limited thereto. For example, a height of the first spline 113 in the inward radial direction can become smaller, and a circumferential width of the first spline 113 in the circumferential direction can become smaller, from one side to the other side of the first spline 113. Likewise, a height of the second spline 131 in the outward radial direction can become smaller, and a circumferential width of the second spline 131 in the circumferential direction can become smaller, from one side to the other side of the second spline 131.

Alternatively, the coupler 111 can include a stopper 1201 protruding from the inner circumferential surface of the coupler 111 and supported on a portion of the damper 105, such as one side, one end, the other side, or the other end thereof, in the axial direction. In this case, the damper 105 can be located between the stopper 1201 and the supporter 121.

Referring to FIG. 12, the coupler 111 includes a stopper 1201 protruding in the inward radial direction from a portion of the coupler 111, such as one end, one side, the other end, or the other end, in the axial direct ion, and the stopper 1201 can be supported by the damper 105 in the axial direction.

That is, in embodiments illustrated in FIGS. 6 to 11, a gap between the coupler 111 including the damper 105 and the second shaft 107 is opened in both sides in the axial direction. On the other hand, in an embodiment illustrated in FIG. 12, a gap between the coupler 111 including the damper 105 and the second shaft 107 is opened in one side and closed by the stopper 1201 in the other side, in the axial direction.

Further, the damper 105 can have a constant thickness from one end to the other end thereof in the axial direction. In other words, the inner circumferential surface of the coupler 111 and the outer circumferential surface of the second shaft 107 can be parallel to each other.

Accordingly, as the presser 103 moves forward, the damper 105 is compressed between the stopper 1201 and the supporter 121, and thus, the rigidity of the damper can be increased, or as the presser 103 moves backward, the damper 105 is decompressed, and thus, the rigidity of the damper can be decreased. That is, a degree of the rigidity of the damper can be adjusted even after having been assembled.

Meanwhile, referring to FIG. 13, a supporting unit 1301 having a ring type can be coupled to the outer circumferential surface of the presser 103. In this case, the supporting unit 1301 can be located between the supporter 121 and the damper 105.

That is, when the presser 103 is coupled to the second shaft 107 and then moves forward, the supporting unit 1301 is supported by the supporter 121 and presses the damper 105.

Since the presser 103 is screwed to the second shaft 107, the supporter 121 rotates when the presser 103 moves forward or backward, and the support unit 1201 is provided to prevent the damper 105 from being damaged by friction generated between the supporter 121 and the damper 105 as the supporter 121 rotates.

That is, the supporting unit 1201 is inserted to the outer circumferential surface of the presser 103, and moves only in the axial direction and presses the damper 105 without rotating along with the presser 103.

Further, the supporting unit 1301 includes a plurality of protrusions 1303 protruding in the outward radial direction, and the protrusions 1303 can be supported by the damper 105.

Since the protrusions 1303 are provided; the supporting unit 1301 is supported only on a part of the damper 105 in the axial direction; and the supporting unit 1301 fixes the remaining portion that is not supported by the protrusions 1303 of the damper 105 in the axial direction between the coupler 111 and the second shaft 107, it is possible to prevent the damper 105 from being separated between the supporting unit 111 and the second shaft 107.

By applying different surface roughness to one or more parts of one or all of the coupler 111 and the second shaft 107, the damper 105 molded by the injection molding can be fixed on a more rough surface and be movable on a more smooth surface. Alternatively, a bonding material can be bonded on a portion to be fixed after the injection molding is performed.

Further, when the presser 103 presses the damper 105, since a movable portion only of the damper 105 can be compressed, fine adjustment of the rigidity of the damper 105 can be obtained. Referring to FIG. 14, the protrusions 1303 can be supported on a portion located between the crest 115 of the first spline 113 and the root 135 of the second spline 131 of the damper 105.

A portion between the root 117 of the first spline 113 and the crest 133 of the second spline 131 of the damper 105 can be fixed.

That is, the protrusions 1203 are supported on the inner side portion 402 of the damper 105 in the axial direction, and the outer side portion 401 of the damper 105 can be fixed in the axial direction between the first spline 113 and the second spline 131.

Alternatively, referring to FIG. 14, the protrusions 1203 can be supported on a portion between the root 117 of the first spline 113 and the crest 133 of the second spline 131 of the damper 105.

A portion between the crest 115 of the first spline 113 and the crest 133 of the second spline 131 of the damper 105 can be fixed.

That is, the protrusions 1203 are supported on the outer side portion 401 of the damper 105 in the axial direction, and the inner side portion 402 of the damper 105 can be fixed in the axial direction between the first spline 113 and the second spline 131.

In case the protrusions 1203 are supported on the outer side portion 401, the protrusions can extend in the radial direction, compared with being supported on the inner side portion 402.

Meanwhile, as described above, to prevent the supporting unit 1301 from rotating along with the presser 103, the second shaft 107 can includes a groove 1603 recessed in a portion on the inner circumferential surface thereof and opened up to one end in the axial direction. In this case, the supporting unit 1301 can includes a rotation preventing unit 1601 that protrudes in the axial direction and that is inserted to the groove 1603.

Referring to FIGS. 16 and 17, when the presser 1301 in which the supporting unit 1301 is inserted is coupled to the second shaft 107, since the rotation preventing unit 1601 is inserted to the groove 1603, the supporting unit 1301 can be fixed with respect to the second shaft 107 in the circumferential direction.

Since the supporting unit 1201 is fixed relative to the second shaft 107 in the circumferential direction, the supporting unit 1201 does not rotate even if the presser 103 rotates. Accordingly, the damper 105 is compressed only in the axial direction, and it is possible to prevent the damper 105 from being damaged by friction.

In the vehicle steering apparatus according to embodiments described above, since the presser is provided that presses and compresses the damper provided between the first shaft and the second shaft in the axial direction, without differently molding the damper by the injection molding according to a required degree of the rigidity, it is possible to satisfy a required degree of rigidity of the damper according to characteristics of types of vehicles by adjusting the rigidity of the damper after the first shaft and the second shaft have been assembled.

The forgoing has been presented to best explain the embodiments and examples and thereby to enable any person skilled in the art to make and use the invention as claimed. Various modifications, additions and substitutions to the described embodiments and examples will be readily apparent to those skilled in the art without departing from the spirit and scope of the present disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A vehicle steering apparatus comprising:
a first shaft having an empty space inside;
a second shaft, one end of which is inserted into the space of the first shaft;
a damper located between an inner circumferential surface of the first shaft and an outer circumferential surface of the second shaft; and
a presser coupled to the one end of the second shaft and pressing the damper in an axial direction in which at least one of the first shaft or the second shaft extends, the presser comprising a supporter protruding from an outer circumferential surface of the presser; and
a coupler having an empty space inside and coupled to the inner circumferential surface of the first shaft,
wherein the damper comprises a protrusion portion that protrudes in the axial direction between the coupler and the second shaft, and that is supported by the supporter.

2. The vehicle steering apparatus according to claim 1, wherein the coupler comprises a first spline formed on an inner circumferential surface of the coupler, and a second spline formed on an outer circumferential surface of the second shaft and engaged with the first spline.

3. The vehicle steering apparatus according to claim 2, wherein the second shaft has an empty space inside, and the presser is inserted and screwed to an inner circumferential surface of the second shaft.

4. The vehicle steering apparatus according to claim 2, wherein a gap between the inner circumferential surface of the coupler and the outer circumferential surface of the second shaft is smaller from one side to the other side of the second shaft in the axial direction.

5. The vehicle steering apparatus according to claim 4, wherein a height of a crest of the first spline which protrudes in an inward radial direction is larger from one side to the other side of the first spline in the axial direction.

6. The vehicle steering apparatus according to claim 4, wherein a height of a crest of the second spline which protrudes in an outward radial direction is larger from one side to the other side of the first spline in the axial direction.

7. The vehicle steering apparatus according to claim 4, wherein a circumferential width of a crest of the first spline is larger from one side to the other side of the first spline in the axial direction.

8. The vehicle steering apparatus according to claim 4, wherein a circumferential width of a crest of the second spline is larger from one side to the other side of the second spline in the axial direction.

9. The vehicle steering apparatus according to claim 2, wherein the coupler comprises a stopper that protrudes from the inner circumferential surface of the coupler and that is supported on a portion of the damper in the axial direction.

10. The vehicle steering apparatus according to claim 9, wherein the damper has a constant thickness from one end up to the other end of the damper in the axial direction.

11. A vehicle steering apparatus comprising:
a first shaft having an empty space inside;
a second shaft, one end of which is inserted into the space of the first shaft;
a damper located between an inner circumferential surface of the first shaft and an outer circumferential surface of the second shaft;
a presser coupled to the one end of the second shaft and pressing the damper in an axial direction in which at least one of the first shaft or the second shaft extends, the presser comprising a supporter protruding from an outer circumferential surface of the presser; and
a supporting unit having a ring type coupled to the outer circumferential surface of the presser, the supporting unit being located between the supporter and the damper.

12. The vehicle steering apparatus according to claim 11, wherein the supporting unit comprises a plurality of protrusions protruding in a radial direction.

13. The vehicle steering apparatus according to claim 12, wherein:
the coupler comprises a first spline formed on an inner circumferential surface of the coupler, and a second spline formed on an outer circumferential surface of the second shaft and engaged with the first spline; and
the plurality of protrusions are supported on a portion located between a crest of the first spline and a root of the second spline of the damper.

14. The vehicle steering apparatus according to claim 13, wherein a portion of the damper which is located between a root of the first spline and a crest of the second spline of the damper is fixed in the axial direction.

15. The vehicle steering apparatus according to claim 12, wherein:
the coupler comprises a first spline formed on an inner circumferential surface of the coupler, a second spline formed on an outer circumferential surface of the second shaft and engaged with the first spline; and
the plurality of protrusions is supported on a portion located between a root of the first spline and a crest of the second spline of the damper.

16. The vehicle steering apparatus according to claim 15, wherein a portion of the damper which is located between a crest of the first spline and a root of the second spline of the damper is fixed in the axial direction.

17. The vehicle steering apparatus according to claim 11, wherein the second shaft comprises a groove recessed in a portion on the inner circumferential surface of the second shaft and opened up to one end of the second shaft in the axial direction, and the supporting unit comprises a rotation preventing unit that protrudes in the axial direction and that is inserted to the groove.

* * * * *